Nov. 14, 1972    R. KREMP ET AL    3,702,729
MOTION PICTURE PROJECTOR FOR USE WITH
FILM-CONTAINING CASSETTES
Filed March 12, 1971    3 Sheets-Sheet 1
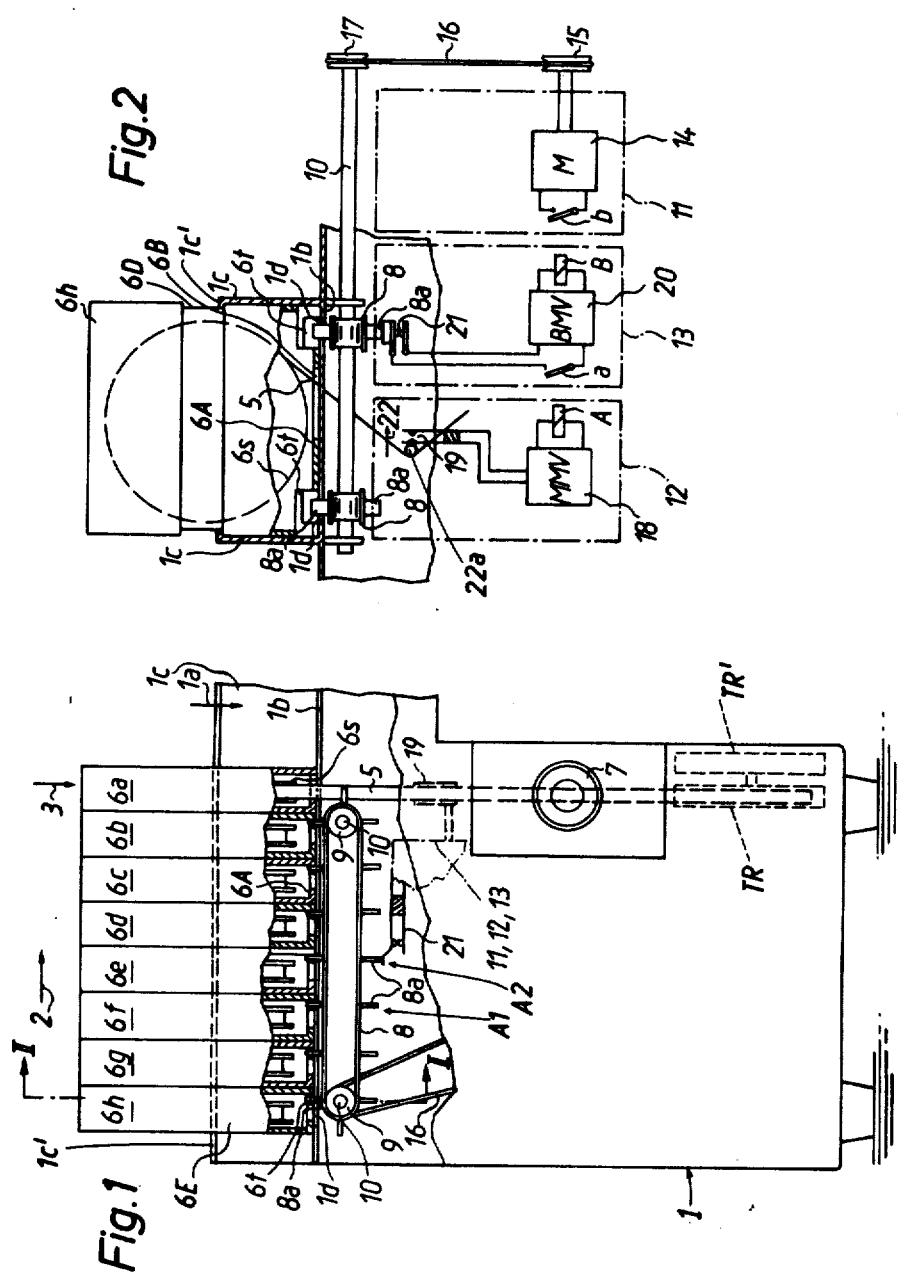
INVENTOR
RUDOLF KREMP
ALFRED WINKLER
FRIDOLIN HENNIG

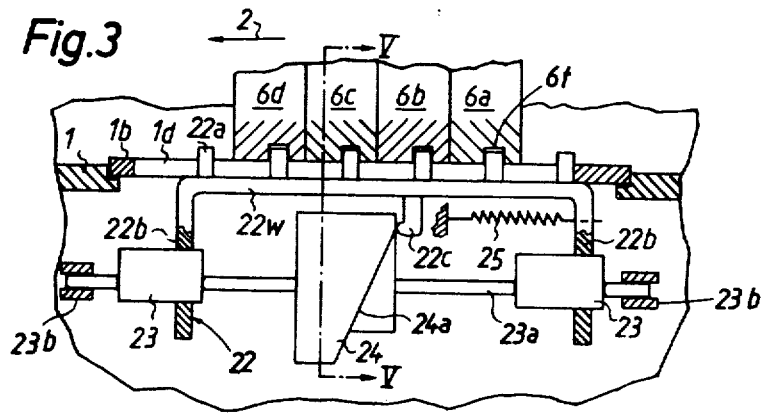
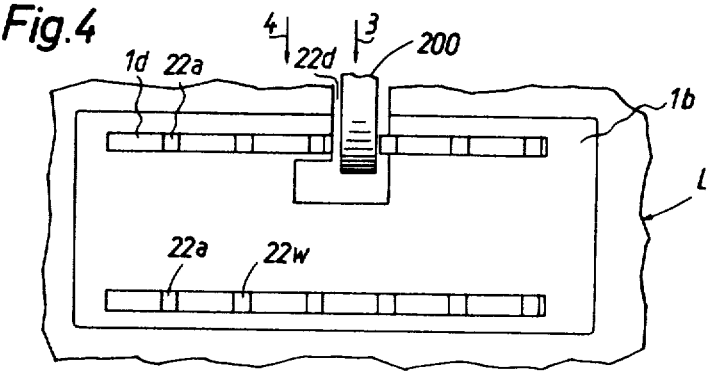
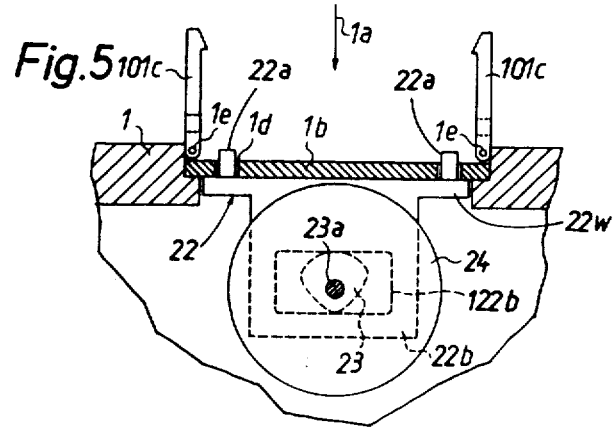

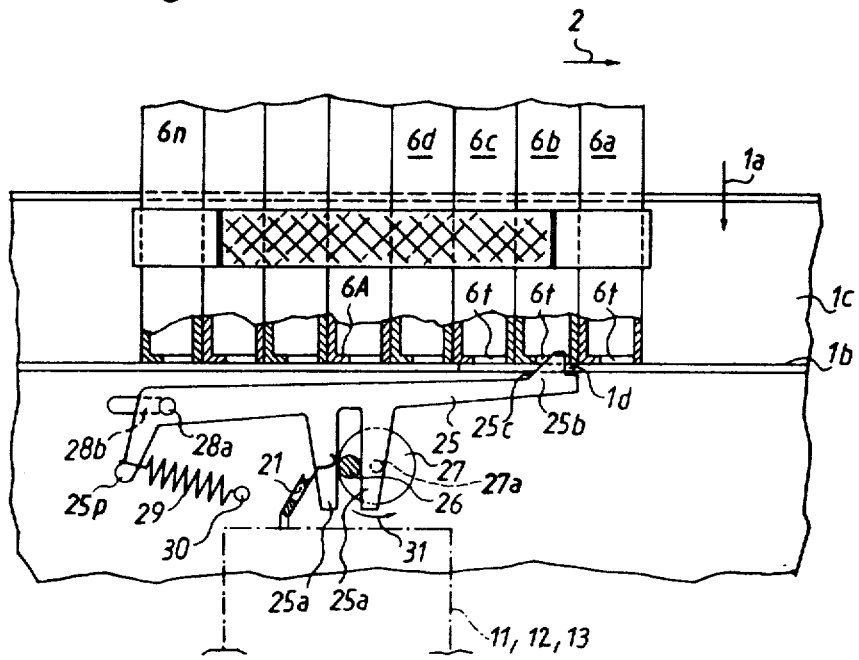

United States Patent Office 3,702,729
Patented Nov. 14, 1972

3,702,729
MOTION PICTURE PROJECTOR FOR USE WITH FILM-CONTAINING CASSETTES
Rudolf Kremp, Grunwald, and Alfred Winkler and Fridolin Hennig, Munich, Germany, assignors to Agfa-Gevaert Aktiengesellschaft, Leverkusen, Germany
Filed Mar. 12, 1971, Ser. No. 123,530
Claims priority, application Germany, Mar. 14, 1970,
P 20 12 282.1
Int. Cl. G03b 21/04
U.S. Cl. 352—123
26 Claims

ABSTRACT OF THE DISCLOSURE

The housing of a motion picture projector is formed with a channel for a set of closely adjacent cassettes each of which contains a supply reel for convoluted motion picture film. The cassettes are movable stepwise by an advancing mechanism serving to place successive cassettes into a projection position in which the film is automatically drawn from the respective supply reel, the images of its frames projected onto a screen, and thereupon returned into the cassette, either while the cassette dwells in the projection position or while the cassette dwells in a rewinding position immediately downstream of the projection position. The motor for the advancing mechanism is started in response to tensioning of film during the last stage of withdrawal from the cassette occupying the projection position, and the motor is arrested by a portion of the advancing mechanism when the transport of cassettes by a step is completed.

BACKGROUND OF THE INVENTION

The present invention relates to cinematographic apparatus in general, and more particularly to improvements in motion picture projectors which utilize film-containing cassettes. Still more particularly, the invention relates to improvements in motion picture projectors wherein successive cassettes are moved to a projection position in which the film which is stored in the cassette occupying such position can be transported lengthwise for presentation of images of its frames. Such motion picture projectors are preferred for presentation of images pertaining to a single subject or to a single sequence of scenes but being too numerous to be recorded on a single length of motion picture film.

It is already known to provide a motion picture projector with an advancing mechanism which is designed to move successive cassettes into a predetermined projection position. The projector includes means which automatically withdraws the film from the cassette occupying the projection position and means for automatically rewinding the film onto the supply reel in such cassette prior to automatic transport of cassettes to place the next cassette into the projection position. It is also known to provide a motion picture projector with means for automatically withdrawing film from the cassette which occupies the projection position, for automatically moving the cassettes by a step when the projection of images on the frames of film in the projection position is completed so as to place the next cassette into the projection position, and for automatically rewinding the film into the cassette which has been moved beyond the projection position while the film is being withdrawn from the cassette occupying the projection position. Thus, each cassette can dwell in the projection position for an interval which is just long enough to complete the presentation of images of the film which is being withdrawn from such cassette, or for an interval which includes the period needed for the presentation of images and for rewinding of film into the cassette before the latter moves beyond the projection position.

A drawback of presently known motion picture projectors which operate in the just described manner is that the advancing mechanism for a series of properly mounted cassettes is not sufficiently versatile and that the speed at which the cassettes are moved in stepwise fashion varies from step to step. Furthermore, the presently known projectors must be provided with separate advancing and arresting mechanisms for the cassettes. This contributes to the bulkiness and cost of the projector. As a rule, the advancing mechanism includes a spring-biased pusher which bears against the rearmost cassette of a set and is permitted to advance the entire set from time to time whereby the bias of the spring decreases so that the speed of forward transport changes from step to step. This is highly undesirable, particularly in projectors wherein the movements of various parts are synchronized so that the termination of step wise movement of a set of cassettes is followed by automatic withdrawal of film from the cassette occupying the projection position, and so on. Furthermore, the number of cassettes which can be mounted on or in such projectors is rather limited because the stroke of the aforementioned pusher cannot be increased at will, mainly because the spring which urges the pusher against the rearmost cassette of a set would have to undergo extremely high compression if the pusher were to transport a substantial number of cassettes. Still further, the cassettes can be shifted and their sequence changed only by overcoming the bias of a relatively strong spring.

It was found that, when the projector accommodates a complete set of cassettes so that the spring which biases the pusher stores a maximum amount of energy, the first step or steps are performed very rapidly and that the speed of forward movement of the cassettes under the action of the spring decreases considerably when the last cassette or cassettes of the set are moved to the projection position. As stated before, such differences in speed can cause undesirable changes in the timing of various operations which take place in automatic response to start, progress and/or completion of stepwise transport of cassettes.

SUMMARY OF THE INVENTION

An object of the invention is to provide a motion picture projector which utilizes cassettes for reels of motion picture film with novel and improved means for advancing a set of cassettes in stepwise fashion so as to place successive cassettes into the projection position.

Another object of the invention is to provide a motion picture projector wherein the cassettes are transported stepwise at a predetermined speed, irrespective of the number of cassettes and irrespective of the position of the foremost or rearmost cassette of a set.

A further object of the invention is to provide the projector with novel drive means for the mechanism which advances a set of cassettes in stepwise fashion to place successive cassettes into the projection position.

An additional object of the invention is to provide a motion picture projector with a simple, compact, rugged and reliable mechanism for advancing each of a desired number of cassettes to a position in which the film can be automatically withdrawn from the cassette occupying such position so that successive frames of the film can be moved into registry with the optical system of the projector.

Still another object of the invention is to provide a motion picture projector wherein the advancing mechanism can initiate the stoppage of the motor which drives the advancing mechanism to thus insure that the advancing mechanism invariably transports the cassettes by steps of identical length.

Another object of the invention is to provide a motion picture projector with novel guide means for sets or groups of arrayed cassettes or analogous containers for reels of motion picture film.

The improved motion picture projector comprises a support which is provided with guide means preferably defining an elongated channel for a series of equidistant film-containing cassettes which are movably received in the guide means and are held in a predetermined orientation with reference to the support, advancing means which is mounted in or on the support and is operable to move the series of cassettes along the guide means by steps of predetermined length so as to place successive cassettes into a projection position, the advancing means comprising actuating means having at least one actuating element which is arranged to move from a first to a second position in response to each operation of the advancing means, and drive means including prime mover means for the advancing means, a starting device (preferably including a monostable multivibrator circuit) actuatable to start the prime mover means, and an arresting device (preferably including a bistable multivibrator circuit) which is actuatable to arrest the prime mover means. One of the two devices is actuated by the actuating element of the advancing means in response to movement of the actuating element between its first and second positions.

In accordance with a more specific feature of the invention, the actuating element is arranged to close a first switch when it reaches its second position to thereby cause the bistable multivibrator circuit of the arresting means to arrest the prime mover means by causing the opening of a second switch in the circuit of the electric motor of the prime mover means. The switch of the motor is closed in response to closing of a third switch which is closed by the trailing portion of film while the film is being withdrawn from the cassette which occupies the projection position.

The advancing means can comprise one or more endless flexible elements, a single advancing member which is movable toward and away from the guide means and is reciprocable lengthwise of the guide means by a system of cams which are driven by the motor of the prime mover means, or a lever which is caused to perform a translatory and pivotal movement in response to starting of the motor.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic front elevational view of a projector which embodies one form of the invention, a portion of the housing and portions of the cassettes being shown in vertical section;

FIG. 2 is a diagrammatic fragmentary vertical sectional view as seen in the direction of arrows from the line II—II of FIG. 1;

FIG. 3 is a fragmentary longitudinal vertical sectional view of a second motion picture projector;

FIG. 4 is a plan view of the structure shown in FIG. 3, with the casettes omitted;

FIG. 5 is a transverse vertical sectional view as seen in the direction of arrows from the line V—V of FIG. 3; and FIG. 6 is a diagrammatic fragmentary longitudinal verical sectional view of a third motion picture projector.

DESCRIPTION OF THE PREFERRED EMBODIMENTS

Referring first to FIGS. 1 and 2, there is shown a motion picture projector having a housing or main support 1. A portion of the top wall 1b of the housing 1 constitutes with two parallel upwardly extending side walls or rails 1c a guide means defining an elongated channel 1a for a series or set of film-containing cassettes or magazines 6a, 6b, 6c, 6d, 6e, 6f, 6g, 6h. The channel 1a is flanked by the side walls or rails 1c and the top wall 1b of the housing 1 constitutes the bottom wall of this channel. The cassettes 6a–6h are inserted into the channel 1a in a predetermined orientation, namely, each cassette is located in a vertical plane and a bottom wall 6A of each cassette is adjacent to the top wall 1b of the housing. Each bottom wall 6A has a first opening 6B for the passage of motion picture film 5 and two additional openings or recesses 6f. Each cassette contains a supply reel 6s for conovluted motion picture film 5. The channel 1a is open from above and at both ends so that the foremost cassette 6a can be withdrawn through one end and that the cassettes can be added to the set from the rear end of the channel. As shown in FIG. 2, each cassette is provided with a circumferentially extending groove 6D and the side walls 1c have projections 1c' which extend into the grooves 6D to prevent unintentional withdrawal of cassettes in an upward direction, as viewed in FIG. 1 or 2.

The cassettes 6a–6h are further provided with conventional coupling means (not shown) which insure that two or more cassettes can be assembled into a set or stack and are then capable of moving as a unit preferably in response to a push or pull upon any one cassette in the longitudinal direction of the channel 1a (i.e., in or counter to the direction indicated by the arrow 2 shown in FIG. 1). In the embodiment of FIGS. 1 and 2, the cassettes 6a–6h are equidistant from each other due to the fact that each cassette is in actual abutment with the neighboring cassette or cassettes The plane of each cassette is normal to the direction of forward transport of the series (arrow 2). The foremost cassette 6a is shown in a so-called projection position (indicated by the arrow 3) in which the film 5 on its supply reel 6s can be automatically withdrawn, threaded through the projector and its leader attached to the core of a takeup reel TR. The film 5 of the cassette 6a in projection position 3 is then advanced in stepwise fashion by a conventional pulldown (not shown) so as to place successive frames of the film into registry with the optical system including the projection lens 7. The film frame which registers with the optical system is located in front of a projection lamp (or in front of a set of mirrors which direct light against such frame) so that the image of the frame is projected onto a screen, not shown.

When the projection of images of frames of the film 5 which is being drawn from the supply reel 6s of the cassette 6a in projection position 3 is terminated, the film can be automatically rewound onto the respective supply reel 6s while the cassette 6a continues to dwell in the projection position 3. This is one of the two presently popular modes of operation of motion picture projectors which employ cassettes for motion picture film. In accordance with the other mode of operation, the cassette 6a is moved by a step from the projection position 3 to a rewinding position which is indicated by the arrow 4. The film 5 is rewound onto the supply reel 6s of the cassette 6a while the latter dwells in the rewinding position 4 so that the presentation of images on the frames of the film in the next cassette 6b can take place during rewinding of film into the cassette 6a. An advantage of the first mode of operation is that the projector is simplier because it can employ a single takeup reel TR which is mounted in the housing 1 in a fixed position. However, the intervals between the presentation of images of films in successive cassettes are relatively long because the film must be rewound onto the supply reel 6s of a preceding cassette before the next cassette is to advance by a step to assume the projection position 3. An advantage of the other mode of operation is that the intervals between the presentations of films in successive cassettes are extremely short because a cassette can be moved from the projection position 3 to the rewinding position 4 as soon as the presentation of images on the frames of its film is completed. A projector which is capable of rewinding film onto a cassette in the rewinding position 4 while the next-following cassette dwells in the projection position 3 normally employs two takeup reels which are caused to change positions when a cassette is moved from the position 3 to the position 4, and the projector is further provided with a specially designed guide system for the film to insure that the film attached to the supply reel in a cassette which is about to move from the projection position 3 to the rewinding position 4 can be moved sideways in order to provide room for the threading of film which is being withdrawn from the next-following cassette (in the projection position 3).

The exact construction of the film threading or withdrawing mechanism which is capable of automatically withdrawing the leader of film 5 from the cassette (6a in FIG. 1) which occupies the projection position 3 and of advancing such leader along a predetermined path for automatic connection to the core of the takeup reel TR forms no part of the present invention. Such mechanisms are well known from the art of motion picture projectors; they normally comprise a driven belt or friction wheel which can enter a cassette through the respective opening 6B to rotate the supply reel 6s in a direction to pay out the film 5, and a deflector which intercepts the leader of the rotating film and directs the leader into the aforementioned path for automatic transport toward the takeup reel TR. The film threading mechanism is automatically withdrawn from the cassette which occupies the projection position 3 as soon as the leader is attached to the core of the takeup reel TR or even before, namely, as soon as the leader moves into the range of the claw pulldown which then takes over and advances the film stepwise past the customary gate behind the projection lens 7.

It is assumed that the projector of FIGS. 1 and 2 is of the type wherein the film is being rewound onto the respective supply reel 6s while the corresponding cassette dwells in the rewinding position 4. Therefore, the projector housing 1 is assumed to further contain or to support a second takeup reel TR' which can change positions with the takeup reel TR in such a way that the reel TR moves to the position occupied by the reel TR' when the cassette 6a moves from the position 3 to the position 4, that the reel TR' thereupon moves to the position occupied by the reel TR when the cassette 6b is moved from the position 3 to the position 4, and so forth. Reference may be had to the copending application Ser. No. 99,569 filed Dec. 18, 1970 by Von Fischern et al. which is owned by the assignee of the present application.

The advancing mechanism which serves to move the set of cassettes 6a–6h in stepwise fashion so as to place successive cassettes into the projection position 3 and thereupon into the rewinding position 4 comprises two conveyors here shown as including endless flexible elements in the form of belts or bands 8 which are trained over pulleys 9 so that the upper stretch of each belt 8 extends in parallelism with and below the top wall 1b of the housing 1. The belts 8 are provided with equidistant outwardly extending motion transmitting actuating elements or projections 8a which can enter the recesses 6t in the bottom walls 6A of the adjoining cassettes to thereby advance the respective cassettes when the belts are set in motion so that their upper stretches advance in the direction indicated by the arrow 2. The belts 8 are located in two parallel vertical planes in registry with the respective recesses 6t of the cassettes in the channel 1a and adjacent to the side walls or rails 1c. The pulleys 9 are mounted on two parallel horizontal shafts 10. As shown in FIG. 2, each shaft 10 is connected with one pulley 9 for one of the belts 8 and with one pulley 9 for the other belt. The shaft 10 which is shown in FIG. 2 further carries a pulley 17 forming part of a belt transmission having a second pulley 15 and an endless belt 16 which is trained over the pulleys 15 and 17.

The top wall 1b of the housing 1 is provided with two elongated slots 1d for the projections 8a of the respective belts 8. The projections 8a on the upper stretches of the belts 8 extend upwardly through the respective slots 1d and into the recesses 6t of the adjacent cassettes 6a–6h. The distance between two neighboring projections 8a equals the width of a cassette. In the embodiment of FIGS. 1 and 2, the length of the upper stretches of the belts 8 is less than the length of the set of cassetes 6a–6h so that the foremost cassette 6a is pushed by the next-following cassette 6b when the belts 8 are set in motion. It is clear, however, that the projector can employ longer belts or belts which are even shorter than the illustrated belts 8. If the cassettes are coupled to each other in such a way that a preceding cassette can pull the next-following cassette, it suffices if only one of the cassettes in the channel 1a is coupled to the belts 8. If the nature of couplings is such that they merely serve to hold the cassettes against lateral movement with reference to each other, i.e., that a next-following cassette can push the preceding cassette, the belts 8 are mounted in such a way that they must be connected with the last cassette of the set in the channel 1a.

It will be noted that, whenever the belts 8 are advanced by a step so as to transport the set of cassettes 6a–6h through a distance corresponding to the width of a single cassette, a projection 8a invariably moves from a first predetermined position indicated by the arrow A1 to a second predetermined position indicated by the arrow A2 whereby the respective projection causes the generation of a signal by closing a switch 21. The switch 21 is closed by one of the projections 8a whenever the belts 8 are brought to a halt.

The drive means for the belts 8 comprises a prime mover unit 11 here shown as including an electric motor 14 which is started in response to closing of a switch b to thereby rotate the shaft for the pulley 15 of the belt transmission 15–17 whereby the pulley 17 drives the respective shaft 10 to rotate the pulleys 9 and to advance the upper stretches of the belts 8 in the direction indicated by the arrow 2. The drive means for the belts 8 further comprises a starting unit 12 for the motor 14 and an arresting unit 13 which includes the aforementioned switch 21.

The starting unit 12 comprises a monostable multivibrator circuit 18, an electromagnet A, and a normally open switch 19 which can be closed by the film 5 of the cassette occupying the projecting position 3. The switch 19 is closed in response to such tensioning of the film 5 which takes place when the film is completely convoluted on the respective takeup reel TR or TR'. It is well known that the trailing end of motion picture film is fixedly secured to the core of the supply reel. Thus, when the takeup reel (TR) has collected the entire film 5 of the cassette (6a) in the projection position 3, the trailing end of the film is subjected to rapidly increasing tension which causes a guide roller 22a for the film 5 to move in the direction indicated in FIG. 2 by the arrow 22 whereby the roller 22a closes the switch 19 in the starting unit 12.

The arresting unit 13 further comprises a bistable multivibrator circuit 20, a switch a which is closed by the armature of the electromagnet A when the latter is energized by the monostable multivibrator circuit 18, and an electromagnet B which is energizable by the bistable multivibrator circuit 20 so that its armature closes the switch b which is in circuit with the motor 14. The switch 19 is connected in the input of the monostable multivibrator circuit 18 and the output of this multivibrator circuit is connected with the electromagnet A. The switches $a$ and 21 are connected in series with each other and are further connected in the input of the bistable multivibrator circuit 20. The output of the bistable multivibrator circuit 20 is connected with the electromagnet B. The energy source for the components 14, 18 and 20 of the drive means for the belts 8 is not shown in FIG. 2. As a rule, the projector is provided with a cable having a plug which can be inserted into a wall outlet.

The operation:

It is assumed that the cassette $6a$ dwells in the illustrated projection position 3, that the aforementioned film threading and withdrawing mechanism has completed the withdrawal of the leader of film 5 from the cassette $6a$ (by way of the opening $6B$ in the bottom wall $6A$ of the cassette $6a$), that the leader of the film 5 is connected to the core of the takeup reel TR, and that the film is transported stepwise by the aforementioned pulldown so that the images of successive film frames are being projected onto a screen, not shown. When the film 5 is fully collected by the takeup reel TR, i.e., when the trailing end of the film 5 is subjected to tension because it is firmly attached to the core of the supply reel $6s$ in the cassette $6a$ while the takeup reel TR continues to rotate in a direction to collect the film, the roller $22a$, is moved by the film 5 in the direction indicated by the arrow 22 to thereby close the switch 19 in the starting unit 12. The roller $22a$ can serve to automatically arrest the transmission which drives the takeup reel TR.

The monostable multivibrator circuit 18 assumes its stable condition in response to closing of the switch 19 and thereby energizes the electromagnet A. The armature of the electromagnet A then closes the switch $a$ and, since the switch 21 is held in closed position by that projection $8a$ which occupies the second position A2 of FIG. 1, the bistable multivibrator circuit 20 assumes one of its two stable conditions to thereby energize the electromagnet B. The armature of the electromagnet B closes the switch $b$ to complete the circuit of the motor 14 so that the latter rotates the shaft 10 of FIG. 2 by way of the belt transmission 15–17. The upper stretches of the belts 8 move in the direction indicated by the arrow 2 and their projections $8a$ advance the set of cassettes $6a$–$6h$ by a step so that the cassette $6a$ reaches the rewinding position 4 while the cassette $6b$ assumes the projection position 3. As the cassette $6a$ moves from the position 3 to the position 4, the trailing portion of the film 5 shown in FIG. 1 moves away from the roller $22a$ so that the switch 19 is free to open. The condition of the monostable multivibrator circuit 18 changes with such a delay following the opening of switch 19 that the electromagnet A remains energized for an interval which suffices to insure that the entire set of cassettes is advanced by a step equalling the width of a cassette. When the belts 8 are in motion, one of the projections $8a$ moves beyond the second position A2 of FIG. 1 so that the switch 21 is free to open but closes again when the next-following projection $8a$ covers the distance between the positions A1 and A2. Such distance equals the width of a cassette. The renewed closing of the switch 21 when the cassettes $6a$, $6b$ respectively assume the positions 4 and 3 causes the bistable multivibrator circuit 20 to assume the other stable condition (the switch $a$ is still held in closed position by the energized electromagnet A) whereby the electromagnet B becomes deenergized and permits the switch $b$ to open. Thus, the motor 14 is arrested at the exact moment when the cassette $6a$ reaches the rewinding position 4. The takeup reels TR and TR' are caused to change positions during transport of the cassette $6a$ from the position 3 to the position 4 so that the film 5 can be transported from the takeup reel TR back to the supply reel $6s$ in the cassette $6a$ while the aforementioned film threading mechanism causes the leader of film on the supply reel $6s$ of the cassette $6b$ (occupying the projection position 3) to be attached to the core of the takeup reel TR'.

It will be seen that one of the projections $8a$ of the advancing means for the cassettes $6a$–$6h$ constitutes or forms part of a signal generating means which causes stoppage of the motor 14 as soon as the set of cassettes $6a$–$6h$ is advanced by a step, namely, through a distance corresponding to the width of a cassette.

The cassettes $6a$–$6h$ are assumed to be coupled to each other so that a pull or a push upon any one of the cassettes suffices to advance the entire set along the channel $1a$. Therefore, and as mentioned above, the belts 8 can be made shorter as long as their projections $8a$ are capable of properly engaging at least one cassette to move it by a step when the motor 14 is started and as long as one of the projections $8a$ moves between the positions A1 and A2 to thereby cause the generation of a signal which initiates the stoppage of motor 14. However, it is equally within the purview of the invention to employ additional or auxiliary advancing means (not shown) which receives motion from the motor 14 and serves to advance cassettes stepwise beyond the rewinding position 4. The arrangement is preferably such that the belts or other types of stepwise operated conveyors leave free the space below the cassettes which occupy the projection position 3 and the rewinding position 4. This is desirable in order to provide ample room for the aforementioned film threading mechanism which withdraws the leader of film from the cassette in the projection position 3 and for the mechanism which rotates the supply reel $6s$ in the cassette occupying the rewinding position 4 so that the supply reel can collect the film.

One of the belts 8 can be omitted or the two belts 8 can be replaced by a single belt of substantial width and carrying two rows of projections $8a$. Also, the belts 8 can be replaced by two sprockets having teeth which can enter the recesses $6t$ to transport one of the cassettes $6a$–$6h$ through a distance corresponding to the width of a cassette. Such sprockets can be used when the cassettes of the set in the channel $1a$ are coupled to each other in such a way that each cassette can push the preceding cassette or cassettes and pull the next-following cassette(s).

It is further within the purview of the invention to mount the belts 8 adjacent to the outer sides of the walls or rails $1c$ and to provide these rails with slots corresponding to the slots $1d$ of the top wall $1b$. Such mounting of the belts is desirable if the recesses $6t$ are provided in the upwardly extending end walls $6E$ of the cassettes.

FIGS. 3 to 5 illustrate portions of the second motion picture projector which is provided with a modified advancing mechanism for cassettes $6a$, $6b$, $6c$, $6d$. The advancing mechanism comprises an inverted U-shaped advancing member 22 having an elongated median portion or web $22w$ located below the top wall $1b$ and movable back and forth lengthwise of the channel $1a$. As shown in FIG. 5, the width of the web $22w$ approximates the width of the channel $1a$ and its length is somewhat less than the length of this channel. The upper side of the web $22w$ is provided with two rows of equidistant actuating elements or projections $22a$ which extend upwardly through the corresponding slots $1d$ of the bottom wall $1b$ and into the recesses $6t$ in the bottom walls of the adjacent cassettes. The distance between the centers of neighboring projections $22a$ in each row corresponds to the width of a cassette, and each projection $22a$ of one row is aligned with a projection of the other row.

The advancing member 22 further comprises two downwardly extending flanges $22b$ at the ends of the web $22w$ and each flange $22b$ is provided with a polygonal aperture $122b$ (see particularly FIG. 5) for one of two eccentric cams 23 mounted on a common shaft $23a$ which is journalled in bearings $23b$ provided in the housing 1. When the eccentric cams 23 rotate with the shaft $23a$, the entire advancing member 22 is moved up or down so that its projections 22a can penetrate into or be withdrawn from the adjacent recesses 6t. The median portion of the shaft 23a is connected with a face cam 24 having an inclined cam face 24a which is tracked by a follower 22c provided on the web 22w. The follower 22c is biased against the cam face 24a by a spring 25. The arrangement is such that the face cam 24 causes the web 22w to move rearwardly (counter to the direction indicated by the arrow 2) when the projections 22a are withdrawn from the recesses 6t (i.e., in the lower end position of the advancing member 22) and that the web 22w moves forwardly by a step (in the direction indicated by the arrow 2) when the projections 22a extend into the adjacent recesses 6t (i.e., in the upper end position of the advancing member 22). In this way, the face cam 24 cooperates with the eccentric cams 23 to impart to the advancing member 22 a movement along an endless path whereby the advancing member causes its projections 22a to advance the set of cassettes 6a–6d by a step (arrow 2) in response to each full revolution of the shaft 23a.

The shaft 23a is rotated by a drive means which preferably corresponds to the drive means 11–13 of FIG. 2. One of the projections 22a performs the function of that projection 8a which serves to actuate the switch 21 of FIG. 1. Each projection 22a performs a cyclical movement which is repeated during each revolution of the shaft 23a, and such cyclical movement is employed to actuate the switch 21 (not shown in FIGS. 3–5) to effect stepwise advances of the set of cassettes 6a–6d so that a fresh cassette reaches the projection position 3 when the preceding cassette reaches the rewinding position 4.

The web 22w of the advancing member 22 is provided with a cutout 22d which registers with the cassettes (6c and 6d) occupying the positions 3 and 4 (see FIG. 4). The purpose of the cutout 22d is to permit unimpeded entry of the aforementioned film threading or withdrawing mechanism which can withdraw the leader of film from the cassette (6c) occupying the projection position 3 and of the mechanism which rotates the supply reel in the cassette (6d) occupying the rewinding position 4 in order to rewind the film onto such supply reel. The threading and rewinding mechanisms can be pivoted or reciprocated between their operative and inoperative positions. The numeral 200 denotes the driven belt of the film threading or withdrawing mechanism.

An advantage of the advancing means shown in FIGS. 3–5 is that the face cam 24 and the eccentric cams 23 insure accurate positioning of cassettes in the projection and rewinding positions. Furthermore, the number of moving parts is less than in the projector of FIGS. 1 and 2. The web 22w can be moved into immediate proximity of cassettes in the positions 3 and 4 to insure retention of such cassettes in accurately determined positions with reference to the aforementioned threading and rewinding mechanisms.

The angular position of the left-hand eccentric cam 23 of FIG. 3 is identical with the angular position of the right-hand eccentric cam. The axial length of these eccentric cams exceeds or at least equals the width of a cassette.

It is clear that the advancing member 22 can be made shorter or longer, depending on the desired number of cassettes in the channel 1a. The projections 22a of the member 22 are located upstream and downstream of the cassettes (6c, 6d) occupying the positions 3 and 4.

As shown in FIG. 5, the side walls or rails 101c are connected to the housing 1 by means of hinges 1e so that they can be folded over the top wall 1b to assume collapsed positions when the channel 1a is empty. This reduces the overall dimensions of the projector for insertion into a carrying case or in storage. The hinges 1e are preferably constructed or the side walls 101c are preferably configurated in such a way that each of these side walls can be releasably retained in the operative or erected position of FIG. 5 or in the collapsed or inoperative position.

A further advantage of the advancing member 22 is that its projections 22a can properly engage and transport cassettes which are located ahead of as well as behind those cassettes which occupy the positions 3 and 4. The cutout 22d insures that the advancing member 22 cannot interfere with the operation of mechanisms at the stations accommodating the cassettes which occupy the projection position 3 and the rewinding position 4.

Referring to FIG. 6, there is shown a portion of a third projector wherein the advancing means for the set of cassetes 6a, 6b, 6c, 6d . . . 6n comprises a pivotable and reciprocable advancing lever 25 having a pair of downwardly extending follower arms 25a which flank an eccentric actuating projection 26 on a rotary displacing disk 27. The displacing disk 27 is mounted on a shaft 27a which can be rotated through 360 degrees in response to starting of a motor (corresponding to the motor 14 of FIG. 2) forming part of a prime mover unit 11. In this embodiment of the invention, the projection 26 which performs a recurring cyclical movement in response to each revolution of the shaft 27a and actuates the switch 21 of the arresting unit 13 is not provided directly on the advancing member 25 but it also forms part of the advancing means for the set of cassettes in the channel 1a.

The pivot pin 28a of the advancing lever 25 extends into an elongated slot 28b of the housing, and the length of the slot 28b is selected in such a way that the motion transmitting projection or tooth 25b of the lever 25 can move forwardly (arrow 2) through a distance corresponding to the width of a cassette when the disk 27 is rotated by the shaft 27a. A helical spring 29 is attached to a fixed post 30 in the housing 1 and to an arm 25p of the lever 25 to bias the latter in a counterclockwise direction, as viewed in FIG. 6. The tooth 25b extends through an elongated slot 1d of the top wall 1b and its tip can penetrate into the adjacent recess 6t in the bottom wall 6A of the adjoining cassette. The arrow 31 indicates the direction of rotation of the displacing disk 27.

In the position shown in FIG. 6, the projection 26 of the displacing disk 27 maintains the advancing lever 25 in the rear end position. When the motor 14 in the prime mover unit 11 is started in response to energization of the electromagnet A in the starting unit 12, the displacing disk 27 begins to rotate in the direction indicated by the arrow 31 whereby the lever 25 moves in a direction to the right and its projection or tooth 25b pushes the cassette 6b in the direction indicated by the arrow 2. The forward transport of the cassette 6b is terminated when the projection 26 covers an angle of 180 degrees; the cassette 6b is then advanced through a distance corresponding to the width of a cassette. It is assumed that the cassettes 6a–6n are coupled to each other so that the cassette 6b can push the cassette 6a and pull the cassettes 6c–6n.

The displacing disk 27 continues to rotate in a counterclockwise direction when the projection 26 reaches its right-hand end position whereby the lever 25 begins to move rearwardly (in a direction to the left, as viewed in FIG. 6) and its tooth 25b is automatically withdrawn from the adjacent recess 6t of the cassette 6b because the tooth 25b is provided with a suitably inclined cam face 25c which slides along the adjacent edge of the bottom wall 6A of the cassette 6b and causes the lever 25 to pivot in a clockwise direction against the opposition of the spring 29. The tip of the tooth 25b then slides along the undersides of the bottom walls 6A of the cassettes 6b, 6c and penetrates into the recess 6t of the cassette 6c under the action of the spring 29. This takes place when the displacing disk 27 completes a full revolution and returns the projection 26 to the position shown in FIG. 6. The projection 26 then closes the switch 21 whereby the motor 14 is arrested in a manner as described in connection with FIG. 2. The lever 25 is then ready to start with the next transport of cassettes 6a–6n as soon as the circuit of the motor in the prime mover unit 11 is completed by the switch 19 of the starting unit 12.

A feature which is shared by all of the described advancing mechanisms for the cassettes is that the speed of such mechanisms does not change from step to step and that the mechanisms can transport with equal facility and with the same degree of accuracy sets which consist of a small number or a very large number of cassettes. Furthermore, when the number of cassettes in the channel 1a is to be changed, the operator need not overcome the bias of springs so that the rearranging of cassettes, the addition of cassettes and/or removal of cassettes can be carried out without the exertion of any appreciable effort.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a motion picture projector, a combination comprising a stationary support provided with straight guide means defining an elongated channel; a series of equidistant cassettes movably received in said channel and each containing a finite length of motion picture film which is automatically withdrawn from the respective cassette during projection and automatically returned into the respective cassette subsequent to projection of its images; advancing means operable to bodily engage at least one cassette of said series and to move said series of cassettes unidirectionally along said guide means by steps of identical length equal to the width of a cassette so as to place successive cassettes into a projection position, said advancing means comprising actuating means having at least one actuating element arranged to move from a first to a second position in response to each operation of said advancing means; and drive means including prime mover means for said advancing means, a starting device actuatable to start said prime mover means and to thus effect an operation of said advancing means, and an arresting device actuatable to arrest said prime mover means upon completed transport of said series of cassettes by one of said steps, said arresting device having a portion extending into the path of movement of said actuating element to effect the actuation of said device in response to movement of said actuating element between said first and second positions thereof.

2. A combination as defined in claim 1, wherein said prime mover means comprises an electric motor and a switch in circuit with said motor, said switch being closed in response to actuation of said starting means and being opened in response to actuation of said arresting means.

3. A combination as defined in claim 1, wherein said advancing means comprises at least one endless flexible element and said actuating means comprises a plurality of equidistant actuating elements extending outwardly from said flexible element, the distance between neighboring actuating elements being equal to the width of a cassette.

4. A combination as defined in claim 3, wherein each of said cassettes has a recess for reception of one of said actuating elements.

5. A combination as defined in claim 1, wherein said advancing means comprises a pair of endless flexible elements disposed in two parallel planes, said actuating means comprising a plurality of equidistant actuating elements provided on each of said flexible elements, said actuating elements extending outwardly from the respective flexible elements and the distance between the neighboring actuating elements on each of said flexible elements bing equal to the width of a cassette, each of said cassettes having a pair of recesses for reception of one actuating element of each of said flexible elements.

6. A combination as defined in claim 5, wherein said guide means comprises a pair of side walls flanking said channel, each of said flexible elements being adjacent to one of said side walls.

7. A combination as defined in claim 1 wherein said advancing means further comprises an advancing member which is movable toward and away and is reciprocable lengthwise of said channel, and cam means driven by said prime mover means to move said advancing member, said actuating element being provided on said advancing member.

8. A combination as defined in claim 7, wherein said advancing member has an elongated portion which is parallel to said channel and said actuating means comprises a plurality of equidistant actuating elements provided on said portion of said advancing member and being receivable in recesses provided therefor in the cassettes of said series, the distance between the neighboring actuating elements on said portion of said advancing member being equal to the width of a cassette.

9. A combination as defined in claim 8, wherein said channel is located in a substantially horizontal plane and said advancing member is mounted in said support at a level below said channel.

10. A combination as defined in claim 1, wherein said starting device is arranged to start said prime mover means by way of said arresting device.

11. A combination as defined in claim 1, wherein said actuating means comprises a plurality of actuating elements located ahead of and behind the cassette which occupies said projection position.

12. A combination as defined in claim 1, wherein said advancing means is remote from the cassette occupying said projection position.

13. A combination as defined in claim 12, wherein said advancing means comprises an advancing member which is reciprocable in the direction of movement of said cassettes with reference to said guide means and is provided with a cutout in the region of the cassette occupying said projection position.

14. A combination as defined in claim 1, wherein said advancing means further comprises a lever movably mounted in said support and having a projection receivable in recesses provided in the cassettes of said series, and rotary displacing means for said lever, said displacing means being rotatable by said prime mover means.

15. A combination as defined in claim 14, wherein said displacing means comprises an eccentric which transmits motion to said lever in response to rotation of said displacing means by said prime mover means and constitutes said actuating element.

16. A combination as defined in claim 1, wherein said guide means comprises a pair of side walls flanking said channel, at least one of said side walls being movable with reference to said support between an erected and a collapsed position.

17. A combination as defined in claim 1, wherein said starting device comprises a monostable multivibrator circuit having an input arranged to produce a signal in response to completed withdrawal of film from the cassette occupying said projection position and an output arranged to start said prime mover means in response to said signal.

18. A combination as defined in claim 17, wherein the tension of film which is being withdrawn from the cassette occupying said projection position increases in response to completed presentation of images of frames on such film and wherein said input comprises a switch which is actuated by film in response to increased tension of the film to thereby produce said signal, said output comprising an electromagnet which is energized in response to the signal from said switch.

19. A combination as defined in claim 18, wherein said circuit assumes its stable condition in response to closing of said switch as a result of tensioning of the film which is being withdrawn from the cassette occupying said projection position.

20. A combination as defined in claim 18, wherein said arresting means comprises a bistable multivibrator circuit having an input which is arranged to produce a first signal in response to energization of said electromagnet and an output which is arranged to start said prime mover means in response to said first signal, said input of said bistable multivibrator circuit being arranged to produce a second signal in response to movement of said actuating element to said second position, said output of said bistable multivibrator circuit being arranged to arrest said prime mover means in response to said second signal.

21. A combination as defined in claim 1, wherein said arresting means comprises a switch which is actuated by said actuating element in response to movement of said actuating element to said second position thereof.

22. A combination as defined in claim 21, wherein said actuating means comprises a single actuating element which performs recurrent movements in response to successive operations of said advancing means.

23. In a motion picture projector, a combination comprising a support provided with guide means defining an elongated channel located in a substantially horizontal plane; a series of equidistant film-containing cassettes movably received in said channel of said guide means, each of said cassettes having at least one recess; advancing means operable to move said series of cassettes along said guide means by steps of predetermined length each of which equals the width of a cassette so as to place successive cassettes into a projection position, said advancing means comprising an inverted U-shaped advancing member mounted in said support at a level below said channel and movable toward and away and reciprocable lengthwise of said channel, said advancing member having an elongated web which is parallel to said channel and two flanges at the ends of said web, said advancing means further comprising a plurality of equidistant actuating elements provided on said web and receivable in said recesses of said cassettes, the distance between the neighboring actuating elements on said web being equal to the width of a cassette and at least one of said actuating elements being arranged to move from a first to a second position in response to each operation of said advancing means; and drive means including prime mover means for said advancing means, a starting device actuatable to start said prime mover means, and an arresting device actuatable to arrest said prime mover means, one of said devices being actuated by said one actuating element in response to movement of said one actuating element between said first and second positions thereof, said advancing means further comprising cam means driven by said prime mover means to move said advancing member, said cam means comprising a pair of coaxial rotary eccentrics cooperating with said flanges of said advancing member to move said web toward and away from said channel and a rotary face cam cooperating with a follower of said advancing member to move said web lengthwise of said channel.

24. In a motion picture projector, a combination comprising a support provided with guide means; a series of equidistant film-containing cassettes movably received in said guide means; advancing means operable to move said series of cassettes along said guide means by steps of predetermined length so as to place successive cassettes into a projection position, said advancing means comprising actuating means having at least one actuating element arranged to move from a first to a second position in response to each operation of said advancing means; and drive means including prime mover means for said advancing means, a starting device actuatable to start said prime mover means and comprising a monostable multivibrator circuit having an input including a first switch arranged to produce a first signal in response to completed withdrawal of film from the cassette occupying said projection position and an output including an electromagnet which is energized in response to said first signal to start said prime mover means, the tension of film which is being withdrawn from the cassette occupying said projection position increasing in response to completed presentation of images of frames on such film and said switch being actuated by film in response to increased tension of the film to thereby produce said first signal, said drive means further including an arresting device actuatable to arrest said prime mover means and comprising a bistable multivibrator circuit having an input including a second switch arranged to produce a second signal in response to energization of said electromagnet and an output arranged to start said prime mover means in response to said second signal, said input of said bistable circuit further including a third switch arranged to produce a third signal in response to movement of said actuating element to said second position and said output of said bistable circuit being arranged to arrest said prime mover means in response to said third signal, said second and third switches being connected in series with each other and one thereof being closed in response to energization of said electromagnet to produce said second signal in the closed position of the other of said second and third switches, said other switch being arranged to open on movement of said actuating element from said first position and to close in response to movement of said actuating element to said second position to thereby produce said third signal.

25. A combination as defined in claim 24, wherein the output of said bistable multivibrator circuit comprises a second electromagnet which is energized in response to said second signal and is deenergized in response to said third signal.

26. A combination as defined in claim 25, wherein said bistable multivibrator circuit assumes a first stable condition in response to said second signal and a second stable condition in response to said third signal.

References Cited

UNITED STATES PATENTS

| | | | |
|---|---|---|---|
| 2,214,468 | 9/1940 | Lannerd | 352—8 |
| 3,139,790 | 7/1964 | Kipping | 352—183 X |
| 1,247,891 | 11/1917 | Stern | 226—74 X |
| 2,152,624 | 4/1939 | Cazes | 226—73 |

FOREIGN PATENTS

| | | | |
|---|---|---|---|
| 679,720 | 9/1952 | Great Britain | 352—123 |

SAMUEL S. MATTHEWS, Primary Examiner

M. H. HAYES, Assistant Examiner

U.S. Cl. X.R.

352—157